United States Patent [19]

Schmerling

[11] 3,855,316

[45] Dec. 17, 1974

[54] ARALKYL ALKYL ETHERS OF POLYMETHYLENE GLYCOLS

[75] Inventor: Louis Schmerling, Riverside, Ill.

[73] Assignee: Universal Oil Products Company, Des Plaines, Ill.

[22] Filed: Aug. 7, 1972

[21] Appl. No.: 278,336

[52] U.S. Cl. .............................. 260/611 A, 424/339
[51] Int. Cl. ............................................. C07c 43/20
[58] Field of Search ........ 260/611 A, 613 D, 613 R, 260/615 A, 615 R

[56] References Cited
UNITED STATES PATENTS
3,367,976   2/1968   Larkin ........................... 260/611 D

OTHER PUBLICATIONS

Walker, Formaldehyde, (3rd ed.), (1967), 167–170, 438.

Primary Examiner—Bernard Helfin
Attorney, Agent, or Firm—James R. Hoatson, Jr.; Raymond H. Nelson; Page, II: William H.

[57] ABSTRACT

Aralkyl alkyl ethers of polymethylene glycols is exemplified by the benzyl ethyl ether of a polymethylene glycol which may be prepared by reacting an aralkyl alcohol with an aliphatic alcohol and formaldehyde in the presence of an acidic catalyst.

6 Claims, No Drawings

ARALKYL ALKYL ETHERS OF POLYMETHYLENE GLYCOLS

This invention relates to novel compositions comprising aralkyl alkyl ethers of polymethylene glycols and to a process for the preparation thereof. The novel compositions of matter which are prepared according to the process hereinafter described in greater detail comprise aralkyl alkyl ethers of polymethylene glycols. These compounds will find a wide variety of use in the chemical field, being especially useful as solvents for organic reactions in which yields of desired products are greatly increased due to the ability of the aforementioned glycols to act as solvents for both the reactants and the product which is obtained thereby. In addition the ethers may also find use as disinfectants or preservatives due to their ability to liberate formaldehyde under acidic conditions.

It is therefore an object of this invention to provide a process for obtaining novel compositions of matter.

Another object of this invention is to provide a process for obtaining aralkyl alkyl ethers of polymethylene glycols by reacting 2 dissimilar alcohols with formaldehyde in the presence of an acidic catalyst.

In one aspect an embodiment of this invention resides in an aralkyl alkyl ether of a polymethylene glycol having the formula:

$$R(OCH_2)_nOR'$$

in which R is an aralkyl radical, R' is an alkyl radical of from 1 to about 4 carbon atoms and $n$ is an integer of from 2 to about 20.

Another embodiment of this invention resides in a process for the preparation of an aralkyl alkyl ether of a polymethylene glycol having the formula:

$$R(OCH_2)_nOR'$$

in which R is an aralkyl radical, R' is an alkyl radical of from 1 to about 4 carbon atoms and $n$ is an integer of from 2 to about 20 which comprises reacting an aralkyl alcohol with an aqueous solution of formaldehyde and an aliphatic alcohol in the presence of an acidic catalyst at reaction conditions, and recovering the resultant aralkyl alkyl ether of a polymethylene glycol.

A specific embodiment of this invention is the benzyl ethyl ether of a polymethylene glycol.

Another specific embodiment of this invention is found in a process for the preparation of an aralkyl alkyl ether of a polymethylene glycol which comprises reacting benzyl alcohol with an aqueous solution of formaldehyde and methyl alcohol in the presence of sulfuric acid at a temperature in the range of from 50° to about 100° C. and a pressure in the range of from about atmospheric to about 100 atmospheres, and receovering the resultant benzyl methyl ether of a polymethylene glycol.

Other objects and embodiments will be found in the following further detailed description of the present invention.

As hereinbefore set forth the present invention is concerned with novel compositions of matter comprising aralkyl alkyl ethers of polymethylene glycols and to a method for the preparation thereof. The process whereby these novel compositions of matter are prepared is effected by reacting an aralkyl alcohol with an aqueous solution of formaldehyde and an aliphatic alcohol containing from 1 to about 4 carbon atoms. The reaction is effected in the presence of an acidic catalyst at temperatures ranging from about 50° to about 150° C. and a pressure in the range of from about atmospheric up to about 100 atmospheres. If superatmospheric pressures are to be employed, the pressures will be afforded by the introduction of a substantially inert gas such as nitrogen or argon into the reaction zone, the amount of pressure which is utilized being that which is sufficient to maintain at least a portion of the reactants in the liquid phase. Examples of acidic catalysts which may be employed in the process of the invention will include inorganic acids such as sulfuric acid, phosphoric acid, hydrochloric acid, hydrobromic acid, hydroiodic acid, etc.; organic sulfur-containing acids such as methanesulfonic acid, ethanesulfonic acid, benzenesulfonic acid, p-toluenesulfonic acid, etc.

Examples of aralkyl alcohols which may be utilized as one of the starting materials in the process of the present invention will include primary aralkyl alcohols such as benzyl alcohol, 2-phenylethanol, 2- and 3-phenylpropanol, 2-, 3- and 4-phenylbutanol, etc. It is also contemplated within the scope of this invention that secondary aralkyl alcohols such as 1-phenylethanol may also be used, although not necessarily with equivalent results. The aliphatic alcohols which are reacted with aralkyl alcohols will usually contain a primary alkyl group of from 1 to about 4 carbon atoms such as methyl alcohol, ethyl alcohol, n-propyl alcohol, n-butyl alcohol, etc. It is also contemplated within the scope of this invention that secondary or tertiary aliphatic alcohols such as isopropyl alcohol, sec-butyl alcohol or t-butyl alcohol may be used as one of the starting materials, although, as in the case of the secondary aralkyl alcohol, not necessarily with equivalent results. As hereinbefore set forth the reaction mixture will also include an aqueous formaldehyde solution, the formaldehyde being present in an amount of from about 25 to about 50 percent formaldehyde.

The process of this invention may be effected in any suitable manner and may comprise either a batch or continuous type operation. When a batch type operation is to be employed the starting materials comprising the aralkyl alcohol and the aqueous solution of formaldehyde containing from about 10 to about 25 percent by weight of an aliphatic alcohol of the type hereinbefore set forth in greater detail are placed in an appropriate apparatus. If the reaction is to be effected at atmospheric pressure, the reaction vessel may comprise a flask provided with heating and stirring means as well as a reflux condenser. However, if superatmospheric pressure will be employed, the reaction vessel will comprise an autoclave of the rotating or stirred type. The acidic catalyst which is to be used to effect the present reaction is then added to the reactor. However, it is also contemplated within the scope of this invention that the acidic catalyst may be added in incremental portions during the reaction period. The particular reaction vessel which is used is then heated to the predetermined temperature and maintained thereat for a period of time ranging from about 0.5 up to about 20 hours or more in duration. At the end of this time, the reactor is allowed to return to room temperature and the reaction mixture is recovered therefrom. The reaction mixture is then subjected to conventional means of separation and purification including washing, drying, extraction, fractional distillation, etc. whereby the desired product comprising an aralkyl alkyl ether of a polymethylene glycol is separated from any unreacted starting materials and recovered.

The process of this invention in which novel compositions of matter comprising an aralkyl alkyl ether of a polymethylene glycol are prepared may also be effected in a continuous manner of operation. When this type of operation is used, the starting material comprising the aralkyl alcohol and the aqueous solution of formaldehyde containing the aliphatic alcohol are continuously charged to a reactor which is maintained at the proper operating conditions of temperature and pressure. In addition, the acidic catalyst may be charged to the reactor through a separate line or, if so desired, it may be admixed with one of the starting materials and the resulting mixture charged thereto in a single stream. Upon completion of the desired residence time, the reactor effluent is continuously withdrawn and subjected to conventional means of separation similar in nature to those hereinbefore set forth whereby the desired product is separated and recovered while any unreacted starting materials are recycled to form a portion of the feed stock.

Examples of novel compositions of matter comprising aralkyl alkyl ethers of polymethylene glycols which may be prepared according to the process of this invention will include those compounds having the formula:

$$R(OCH_2)_nOR'$$

in which R is an aralkyl radical, R' is an alkyl radical of from 1 to about 4 carbon atoms and $n$ is an integer of from 2 to about 20. Some specific examples of these compounds are the benzyl methyl ether of a polymethylene glycol, the benzyl ethyl ether of a polymethylene glycol, the benzyl n-propyl ether of a polymethylene glycol, the benzyl n-butyl ether of a polymethylene glycol, the 2-phenethyl methyl ether of a polymethylene glycol, the 2-phenethyl ethyl ether of a polymethylene glycol, the 2-phenethyl propyl ether of a polymethylene glycol, the 2-phenethyl butyl ether of a polymethylene glycol, the 3-phenpropyl methyl ether of a polymethylene glycol, the 3-phenpropyl ethyl ether of a polymethylene glycol, the 3-phenpropyl propyl ether of a polymethylene glycol, etc., the number of methylene radicals in the formula being dependent upon the amount of formaldehyde which undergoes reaction. It is to be understood that the aforementioned compounds are only representative of the class of ethers which may be prepared and that the present invention is not necessarily limited thereto.

The following examples are given to illustrate the process of the present invention which, howvever, are not intended to limit the generally broad scope of the present invention in strict accordance therewith.

EXAMPLE I

In this example 25 g. (0.23 mole) of benzyl alcohol and 103 g. (1.27 mole) of an aqueous solution of 36–38% formaldehyde containing from 10 to 13% methyl alcohol was placed in a reactor, a clear solution resulting from the addition, and 0.2 g. of concentrated sulfuric acid was added to the reactor which was then heated to a temperature of 80° C. on a steam bath. The reactor was maintained at a temperature in the range of from 80° to 86° C. for a total contact time of 5.5 hours. During this 5.5 hours, an additional amount of sulfuric acid was added batchwise in an amount of 0.6 g. of acid after a period of 2.5 hours and an additional 18 g. of acid after another hour period. The solution was analyzed by means of a gas-liquid chromatograph before the additional amount of catalyst was added. At the end of the first 2½ hours gas-liquid chromatographic analysis disclosed the presence of 16% of

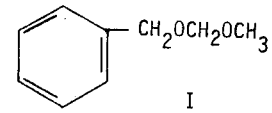

and 10% of

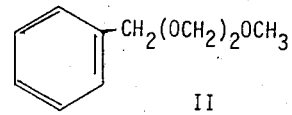

After the addition of the second amount of the catalyst gas-liquid chromatographic analysis disclosed the presence of 25% of I, 11% of II and 2% of

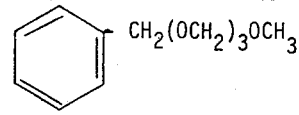

At the end of the 5.5 hour reaction time, gas-liquid chromatographic analysis showed the presence of 30% of I, 15% of II and 6% of III.

EXAMPLE II

To illustrate the operability of other acidic catalysts 11 g. (0.10 mole) of benzyl alcohol and 30 g. (0.37 mole) of a 36–38% aqueous solution of formaldehyde containing 10–13% methyl alcohol along with 7 g. of concentrated (50%) hydroiodic acid were placed in a reactor heated by a steam bath. The reactor was heated to a temperature of 80° C. and maintained in a range of from 80° to 85° C. for a period of 2.5 hours. At the end of this time, the reaction product was recovered and subjected to gas-liquid chromatographic analysis which disclosed the presence of 25% of I, 10% of II, and 3% of III.

EXAMPLE III

In this example 10 g (0.09 mole) of benzyl alcohol and 26 g. (0.32 mole) of a 36–38% aqueous solution of formaldehyde containing methyl alcohol along with 5 g. of methanesulfonic acid were treated in a manner similar to that set forth in the above examples, that is, by heating the reactor to a temperature of 88° C. on a steam bath for a period of 0.7 hours. At the end of this time, gas-liquid chromatographic analysis of the product showed the presence of 12% of I and 4% of II.

EXAMPLE IV

To a reaction vessel provided with heating means is added 30.5 g. (0.25 mole) of 2-phenylethanol along with 103 g. (1.27 mole) of a 38% aqueous solution of formaldehyde containing 15% methyl alcohol and 3 g. of concentrated sulfuric acid. The solution is then heated to a temperature of 85° C. and maintained thereat for a period of 5 hours, an additional portion of concentrated sulfuric acid amounting to 6 g. being added in two incremental portions during the reaction time. At the end of the 5.5 hour residence time, heating is discontinued and after the reactor has returned to room temperature, the mixture is subjected to gas-liquid chromatographic analysis, this analysis will disclose the presence of a mixture of

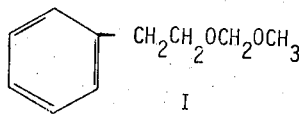
I and

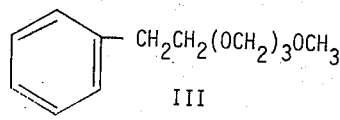
III these 3 ethers, namely, 2-phenethyl methyl ethers of polymethylene glycols.

EXAMPLE V

In this example 57 g. (0.53 mole) of benzyl alcohol and 103 g. (1.27 mole) of a 38% aqueous formaldehyde solution containing 12% ethyl alcohol along with 5 g. of methanesulfonic acid are placed in a reaction vessel which is thereafter placed on a steam bath. The vessel is heated to a temperature of 85° C. and maintained in a range of from 85° to 89° C. for a period of 2.5 hours. At the end of this time, heating is discontinued and the reaction mixture after returning to room temperature is subjected to gas-liquid chromatographic analysis. This analysis will disclose the presence of a mixture of benzyl ethyl ethers of polymethylene glycols having the generic formula:

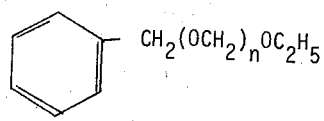

in which $n$ is 1, 2, or 3.

EXAMPLE VI

In like manner a mixture of 25 g. (0.23 mole) of benzyl alcohol and 103 g. (1.27 mole) of a 38% aqueous solution of formaldehyde containing 12% of n-propyl alcohol along with 7 g. of phosphoric acid are heated to a temperature of 85° C. and maintained thereat for a period of 3.5 hours. At the end of this time, heating is discontinued, the apparatus is allowed to return to room temperature and the reaction product is analyzed by means of gas-liquid chromatographic equipment. This analysis will disclose the presence of a mixture of benzyl propyl ethers of polymethylene glycols having the generic formula:

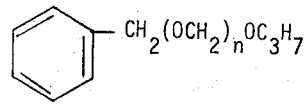

in which $n$ is 1, 2, or 3.

EXAMPLE VII

In this example 30.5 g. (0.25 mole) of 2-

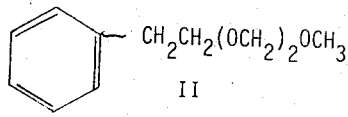
II phenylethanol along with 100 g. (1.25 mole) of a 38% aqueous solution of formaldehyde containing 12% ethyl alcohol and 2.5 g. of concentrated sulfuric acid are heated on a steam bath to a temperature of 80° C. for a period of 2 hours with stirring. At the end of this 2-hour period, an additional 2.5 g. of concentrated sulfuric acid is slowly added and the mixture is stirred for an additional period of 2 hours while maintaining the temperature in a range of from 80° to 85° C. At the end of this period, heating is discontinued and the reaction mixture after returning to room temperature is analyzed by means of a gas-liquid chromatograph. This analysis will disclose the presence of a mixture of 2-phenethyl ethyl ethers of polymethylene glycols having the generic formula:

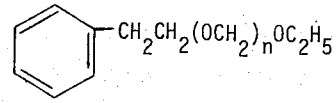

in which $n$ is 1, 2, or 3.

I claim as my invention:

1. An aralkyl alkyl ether of a polymethylene glycol having the formula:

$$R(OCH_2)_nOR'$$

in which R is an unsubstituted aralkyl hydrocarbon radical, R' is an alkyl radical of from 1 to about 4 carbon atoms, and n is an integer of from 2 to about 20.

2. The aralkyl alkyl ether of a polymethylene glycol as set forth in claim 1 being the benzyl methyl ether of a polymethylene glycol.

3. The aralkyl alkyl ether of a polymethylene glycol as set forth in claim 1 being the 2-phenethyl methyl ether of a polymethylene glycol.

4. The aralkyl alkyl ether of a polymethylene glycol as set forth in claim 1 being the benzyl ethyl ether of a polymethylene glycol.

5. The aralkyl alkyl ether of a polymethylene glycol as set forth in claim 1 being the benzyl propyl ether of a polymethylene glycol.

6. The aralkyl alkyl ether of a polymethylene glycol as set forth in claim 1 being the 2-phenethyl ethyl ether of a polymethylene glycol.

* * * * *